(12) United States Patent
Kim et al.

(10) Patent No.: US 8,169,408 B2
(45) Date of Patent: May 1, 2012

(54) DISPLAY FOR MULTI-FUNCTION KEY PAD AND ELECTRONIC DEVICE HAVING THE SAME

(75) Inventors: Kyongdo Kim, Yongin-si (KR); Hyunah Jang, Yongin-si (KR); Hyungjun Namgung, Yongin-si (KR); Woojong Lee, Yongin-si (KR)

(73) Assignee: Samsung Mobile Display Co., Ltd., Giheung-Gu, Yongin, Gyunggi-Do (KR)

( * ) Notice: Subject to any disclaimer, the term of this patent is extended or adjusted under 35 U.S.C. 154(b) by 1036 days.

(21) Appl. No.: 12/081,708

(22) Filed: Apr. 18, 2008

(65) Prior Publication Data

US 2009/0066655 A1    Mar. 12, 2009

(30) Foreign Application Priority Data

Apr. 19, 2007    (KR) .................. 10-2007-0038402

(51) Int. Cl.
   G09G 5/00    (2006.01)
(52) U.S. Cl. ...................... 345/169; 345/172
(58) Field of Classification Search .......... 345/168–172, 345/107; 359/296
   See application file for complete search history.

(56) References Cited

U.S. PATENT DOCUMENTS

| | | | |
|---|---|---|---|
| 6,262,706 B1 * | 7/2001 | Albert et al. .................. | 345/107 |
| 7,728,236 B2 * | 6/2010 | Lee et al. | |
| 2004/0217939 A1 * | 11/2004 | Levy et al. ..................... | 345/156 |
| 2005/0056531 A1 * | 3/2005 | Yu et al. ........................ | 200/310 |
| 2005/0090288 A1 * | 4/2005 | Stohr et al. | |
| 2005/0236367 A1 * | 10/2005 | Wang et al. | |
| 2006/0132449 A1 * | 6/2006 | Pironio | |
| 2006/0146027 A1 * | 7/2006 | Tracy et al. | |
| 2006/0152472 A1 * | 7/2006 | Nishiyama et al. | |
| 2006/0152473 A1 * | 7/2006 | Johnson et al. | |
| 2006/0170665 A1 * | 8/2006 | Morita et al. | |
| 2006/0209009 A1 * | 9/2006 | Schlangen et al. | |
| 2006/0221059 A1 * | 10/2006 | Choi et al. | |
| 2006/0227097 A1 * | 10/2006 | Zhou et al. | |
| 2007/0013649 A1 * | 1/2007 | Kim et al. | |
| 2007/0018965 A1 * | 1/2007 | Paun et al. | |

FOREIGN PATENT DOCUMENTS

| | | |
|---|---|---|
| JP | 2002-216570 | 8/2002 |
| KR | 10-2004-0103562 | 12/2004 |
| KR | 10-2007-0009015 | 1/2007 |

* cited by examiner

*Primary Examiner* — Jimmy H Nguyen
(74) *Attorney, Agent, or Firm* — Robert E. Bushnell, Esq.

(57) ABSTRACT

Disclosed are a display for a multi-function key pad and an electronic device having the display that have both input and output functions. The display for the multi-function key pad includes an electrophoretic display panel provided with a plurality of display regions arranged in a matrix form with having a non-display region as a boundary, a circuit board provided on the display panel and including a plurality of openings formed on regions corresponding to the display regions and a plurality of keys formed on regions that are outer circumference edges of the openings and correspond to the non-display region, and a pad provided on the circuit board and including a plurality of transparent windows formed on regions corresponding to the openings and a plurality of pressing units formed on regions that are outer circumference edges of the transparent windows and correspond to the keys.

24 Claims, 10 Drawing Sheets

DISPLAY FOR MULTI-FUNCTION KEY PAD AND ELECTRONIC DEVICE HAVING THE SAME

CLAIM FOR PRIORITY

This application makes reference to, incorporates the same herein, and claims all benefits accruing under 35 U.S.C. §119 from an application earlier filed in the Korean Intellectual Property Office on 19 Apr. 2007 and there duly assigned Serial No. 10-2007-0038402.

BACKGROUND OF THE INVENTION

1. Field of the Invention

The present invention relates to a display for multi-function key pad.

2. Description of the Related Art

Generally, electronic devices (for example, a mobile communication terminal) include a key pad device for inputting various instructions easily. For example, characters, numbers, or specific symbols have been previously allocated to each key of the key pad device. A user can properly perform various functions such as phone calling and receiving, character inputting, and message sending by operating the key pad.

However, in the conventional key pad device, unique characters, numbers, or specific symbols have been already allocated to each key. Therefore, the conventional key pad device has a disadvantage in that the key pad device is unsuitable for recent electronic devices performing various and complicated functions. For example, it is difficult or impossible to input characters in global roaming of the mobile communication terminal because a predetermined character is fixedly allocated to each key.

In addition, there is another problem that it is inconvenient to use MP3 function or camera function because the user should operate keys in many times to use the functions in the mobile communication terminal. In other words, a user interface depth is deep, and thus key operation is inconvenient and difficult.

On the other hand, technologies using a touch screen have been developed as a key pad device for solving the problem as described above. However, the touch screen has a problem that instructions are not properly inputted, or the same instruction is repeatedly inputted in several times because the user cannot feel a sense of pressing the keys when the user touches or presses the keys. Furthermore, when a key pad device is made of the touch screen, power is supplied to pixels formed on the entire touch screen, thereby increasing power consumption and manufacturing cost.

SUMMARY OF THE INVENTION

Accordingly, the present invention is to provide a display for a multi-function key pad and an electronic device having the display that can input and output various information.

The present invention is to provide a display for a multi-function key pad and an electronic device having the display that can provide a shallow user interface depth and easy key operation by variously changing and displaying characters, numbers, specific symbols, still images and moving images according to the user's choice.

The present invention is to provide a display for a multi-function key pad and an electronic device having the display that can save power consumption and manufacturing cost.

According to an aspect of the present invention, there is provided a display for a multi-function key pad, which includes an electrophoretic display panel including a plurality of display regions arranged in a matrix form, a circuit board arranged on the electrophoretic display panel, and a pad arranged on the circuit board. Each of the display regions is enclosed by a non-display region. The circuit board includes a plurality of openings formed on regions corresponding to the display regions of the electrophoretic display panel, and a plurality of keys formed on regions that are outer circumference edges of the openings and correspond to the non-display region. The pad includes a plurality of transparent windows formed on regions corresponding to the openings of the circuit board and includes a plurality of pressing units formed on regions that are outer circumference edges of the transparent windows and correspond to the keys.

According to another aspect of the present invention, there is provided an electronic device, which includes: a display for a multi-function key pad and a main display panel electrically and mechanically coupled to the display for multi-function key pad. The display for the multi-function key includes an electrophoretic display panel provided with a plurality of display regions arranged in a matrix form with a non-display region as a boundary, a circuit board provided on the electrophoretic display panel and including a plurality of openings formed on regions corresponding to the display regions and a plurality of keys formed on regions that are outer circumference edges of the openings and correspond to the non-display region, and a pad provided on the circuit board and including a plurality of transparent windows formed on regions corresponding to the openings and a plurality of pressing units formed on regions which are outer circumference edges of the transparent windows and correspond to the keys.

As described above, the display for multi-function key pad and the electronic device having the same can input various types of instructions and output information by the key pad.

In addition, the display for a multi-function key pad and the electronic device having the same can provide a shallow user interface depth and easy key operation by variously changing and displaying characters, numbers, specific symbols, still images and moving images according to the user's choice.

In addition, the display for multi-function key pad and the electronic device having the same can keep images without continuous voltage supply and thus minimize power consumption due to bistable characteristic of the electrophoretic display panel.

In addition, the display for multi-function key pad and the electronic device having the same may further include a backlight at one side of the electrophoretic display panel, thereby easily providing various images even in the night without daylight.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 1b is an exploded perspective view of FIG. 1a;

DETAILED DESCRIPTION OF EXEMPLARY EMBODIMENTS

Figure 1A:
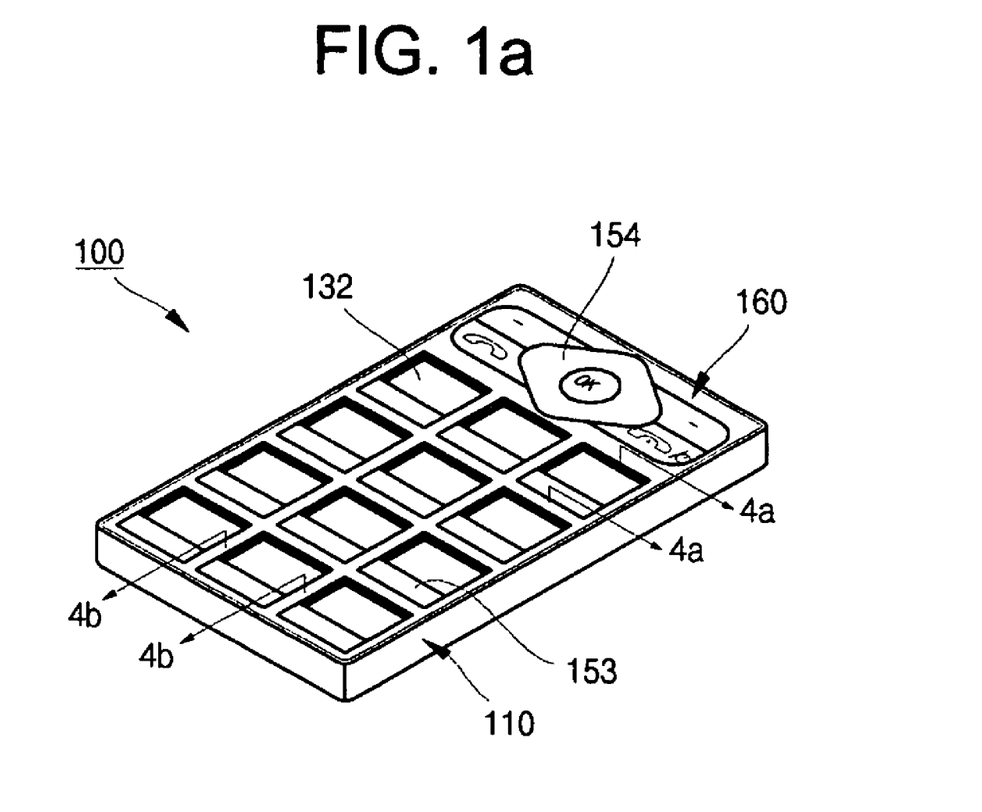
FIG. 1a is a perspective view illustrating an assembled state of a display for a multi-function key pad according to one exemplary embodiment of the present invention.
Figure 1B:
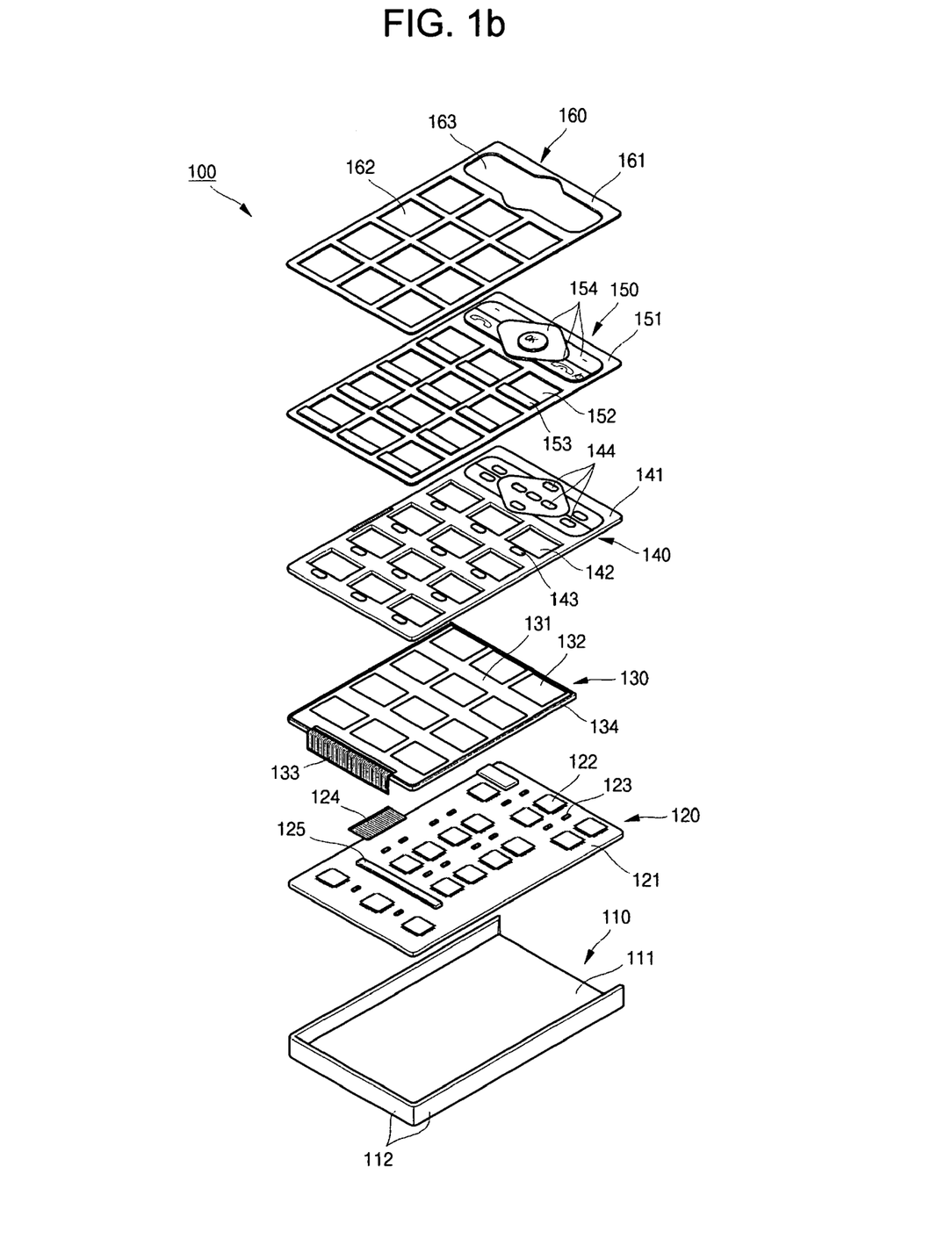

FIG. 1a shows a perspective view illustrating an assembled state of a display for a multi-function key pad according to one exemplary embodiment of the present invention, and FIG. 1b shows an exploded perspective view of FIG. 1a. Referring to FIGS. 1a and 1b, the display 100 for a multi-function key pad includes a case 110, a main circuit board 120 mounted on the case 110, an electrophoretic display panel 130 mounted on the main circuit board 120, a circuit board 140 mounted on the electrophoretic display panel 130, a pad 150 mounted on the circuit board 140, and a cover 160 mounted on the pad 150.

The case 110 includes a bottom surface 111, a plurality of side walls 112 formed in a predetermined height at a side part of an edge of the bottom surface 111. The case 110 may be formed of any one selected from a plastic resin, a metal and its equivalents, but not limited thereto. In addition, the main circuit board 120, the electrophoretic display panel 130, the circuit board 140, the pad 150 and cover 160 may be mounted on the case 110 in the order. A battery may be further provided to the case 110 for supplying power to the main circuit board 120, the electrophoretic display panel 130 and the circuit board 140, but not shown in the drawing.

The main circuit board 120 has a main circuit board substrate body 121 of a roughly rectangular shape, and includes a plurality of active devices 122, a plurality of passive devices 123, a first flexible circuit 124 and a connector 125 mounted on the substrate body. The main circuit board 120 supplies or receives an electrical signal to or from a main display panel of the electrophoretic display panel 130, the circuit board 140 or a main electrophoretic display panel of an electronic device to be described below. The first flexible circuit 124 may be electrically coupled to the circuit board 140. In addition, the connector 125 may be electrically coupled to a second flexible circuit 133 that is connected to an electrophoretic display panel 130 to be described below.

The electrophoretic display panel 130 may be formed of a plurality of display regions 132 arranged in a roughly matrix form (a two-dimensional array) with a non-display region 131 as a boundary. Of course, one side of the electrophoretic display panel 130 may be electrically coupled to the second flexible circuit 133 that is electrically coupled to the connector 125 of the main circuit board 120. In addition, lower and side surfaces of the electrophoretic display panel 130 may be covered by a bezel 134 made of resin or metal so as not to be damaged by external impact. Here, the twelve display regions 132 formed on the electrophoretic display panel 130 are shown in the drawing as an example, but not limited thereto. In other words, the larger or smaller numbers of display regions 132 than twelve may be formed on the electrophoretic display panel 130. Further, the display regions 132 formed on the electrophoretic display panel 130 are shown in rectangular shape, but not limited thereto. In other words, the display region 132 may be formed in various types such as circle, triangle, pentagon, or hexagon. The display region 132 displays characters, numbers, specific symbols, still images and moving images according to the user's choice, and thus, a user interface depth becomes shallow and key operation also becomes easy. An image is not displayed on the non-display region 131 formed outside the display region 132, thereby minimizing power consumption. Pixels may be formed on the display region 132 of the electrophoretic display panel 130 for displaying a predetermined color (red, green, blue, and mixed color thereof), and pixels may not be formed on the non-display region 131 so as not to display the colors.

Thus, power is used only in the display region 132 of the electrophoretic display panel 130 where the pixels are substantially formed, and power is almost not used in the non-display region 131 where the pixels are not formed. The electrophoretic display panel 130 will be explained in more detail below.

The circuit board 140 includes a substrate body 141 having an opening 142 formed on a region corresponding to the display region 132 of the electrophoretic display panel 130, and a first key 143 formed on a region corresponding to the non-display region 131 at one side of the opening 142. Here, the opening 142 may be covered by any one selected from a transparent resin, a transparent glass and its equivalents. The display region 132 of the electrophoretic display panel 130 may be better separated from external environments. In addition, a plurality of second keys 144 may be formed also on a region of the circuit board 140 that does not correspond to the display region 132 of the electrophoretic display panel 130. That is, the plurality of second keys 144 may be formed also on regions that do not correspond to the opening 142. The circuit board 140 may be electrically coupled to the main circuit board 120 by the first flexible circuit 124. Thus, control signals for the keys 143 and 144 provided on the circuit board 140 can be properly transmitted to the main circuit board 120 through the first flexible circuit 124. The structure of the key 143 will be explained in more detail below.

The pad 150 includes a pad body 151 having a transparent window 152 formed on the region corresponding to the opening 142, that is, the region corresponding to the display region 132, and a first pressing unit 153 formed on the region that is one side of the transparent window 152 and corresponds to the key 143. A plurality of second pressing units 154 may be further formed also on regions of the pad which do not correspond to the display region 132 of the electrophoretic display panel 130 or the opening 142 of the circuit board 140. In other words, the plurality of second pressing units 154 may be formed on the region corresponding to the second keys 144 of the circuit board 140. Predetermined characters, numbers, or special symbols may be previously formed on the surface of the second pressing unit 154 by methods such as intaglio, engraving or printing. In addition, the transparent window 152 may be covered by any one selected from a transparent resin, a transparent glass and its equivalents. When a user presses the pressing units pressing unit 153 and 154, the keys 143 and 144 are operated. Then, control signals for the keys 143 and 144 can be transmitted to the main circuit board 120 through the first flexible circuit 124. The sectional structures of the pressing unit 153 and pad 150 will be explained in more detail below.

The cover 160 includes a cover body 161 having a window 162 formed on a region corresponding to the opening 142 of the pad 150 and the pressing unit 153. Thus, the display region 132 of the electrophoretic display panel 130 is exposed to the outside through the window 162 of the cover 160. Thus, the user can input a predetermined instruction by operating the pressing unit 153 exposed through the window 162 of the cover 160. Of course, an elongated window 163 may be formed on the cover 160 so as to expose the pressing unit 154 of the pad 150 provided with predetermined characters previously formed by methods such as intaglio, engraving or printing. In addition, the windows 162 and 163 may be also covered by any one selected from a transparent resin, a transparent glass and its equivalents.

Figure 2:
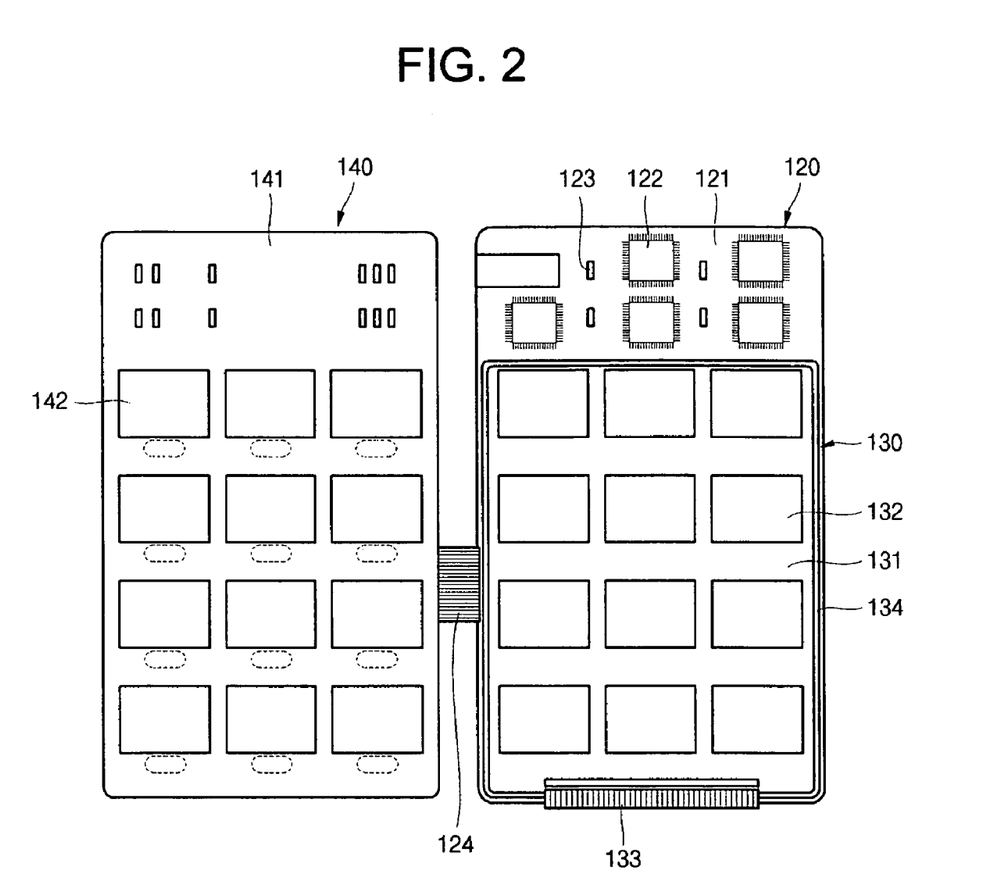
FIG. 2 is a plan view illustrating a state that an electrophoretic display panel is mounted on a main circuit board of the display for a multi-function key pad.

FIG. 2 shows a plan view illustrating a shape that a display panel is mounted on a main circuit board of the display for a multi-function key pad. Referring to FIG. 2, the electrophoretic display panel 130 may be mounted on the main circuit board 120. The electrophoretic display panel 130 may be electrically coupled to the main circuit board 120 through the second flexible circuit 133. In addition, the circuit board 140 may be electrically coupled to the main circuit board 120 through the first flexible circuit 124. The display region 132 formed on the electrophoretic display panel 130 and the opening 142 formed on the circuit board 140 may be formed on positions corresponding to each other.

Figure 3:
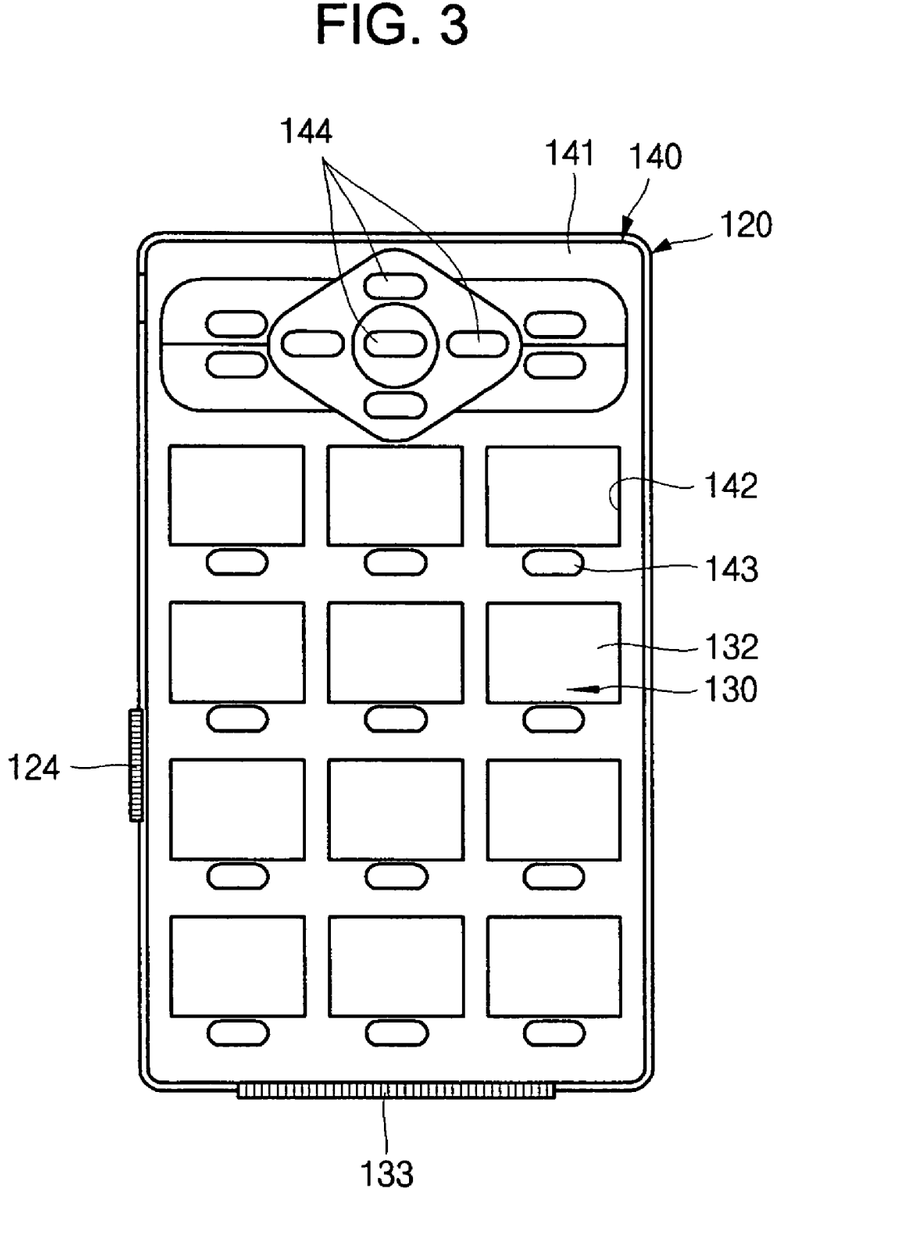
FIG. 3 is a plan view illustrating a state that the electrophoretic display panel and a circuit board are sequentially mounted on the main circuit board of the display for a multi-function key pad.

FIG. 3 shows a plan view illustrating a shape in which the electrophoretic display panel and a circuit board are sequentially mounted on the main circuit board of the display for a multi-function key pad. Referring to FIG. 3, the electrophoretic display panel 130 and circuit board 140 may be sequentially mounted on the main circuit board 120. The circuit board 140 may be electrically coupled to the main circuit board 120 through the first flexible circuit 124. In addition, the display region 132 of the electrophoretic display panel 130 can be exposed to the outside through the opening 142 formed on the circuit board 140. Thus, the user can operate the keys with watching various characters, numbers, specific symbols, still images or moving images displayed on the display region 132 through the opening 142 formed on the circuit board 140. The first key 143 may be formed on the outer circumference edge of the opening 142 of the circuit board 140.

Figure 4A:
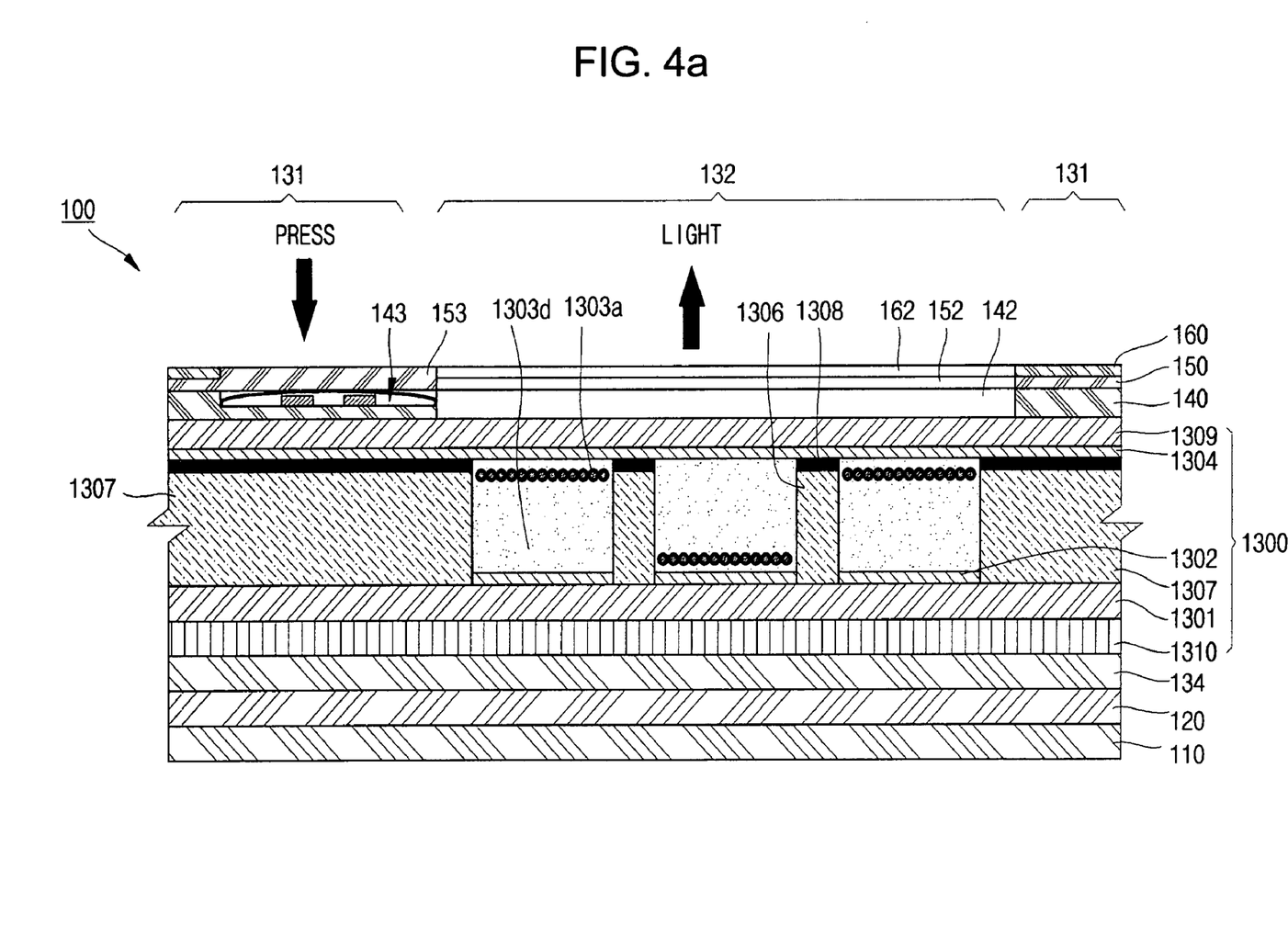
FIG. 4a is a schematic sectional view taken along 4a-4a line of FIG. 1.
Figure 4B:
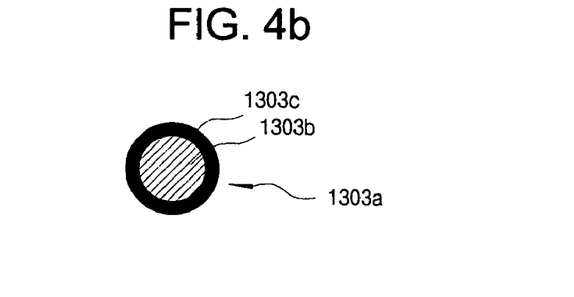
FIG. 4b is a magnified sectional view illustrating a charged particle.

FIG. 4a shows a schematic sectional view taken along 4a-4a line of FIG. 1, and FIG. 4b shows a sectional view of a charged particle for an example. A display 100 for a multi-function key pad shown in FIGS. 4a and 4b is not exactly proportional to actual size, thickness and length, and exaggerated or simplified for comprehension of the present invention. For example, three first electrodes 1302, three fluids 1303d and one second electrode 1304 are shown in the display panel electrophoretic display panel 1300 of FIG. 4a. However, those may be actually formed in much more or less numbers. In addition, the first key 143 of FIG. 4a is shown to have a length roughly similar to a length of the first electrode 1302, but may be actually much larger or smaller.

The electrophoretic display panel 1300 shown in FIG. 4a includes a first substrate 1301, the first electrode 1302 formed on the first substrate 1301, the fluid 1303d arranged on the first electrode 1302 and including dispersed charged particles 1303a, the second electrode 1304 arranged above the fluid 1303d, a first separator 1306 formed between two first electrodes, and a second separator 1307 integrally formed on the outer circumference edge of the first electrode 1302 and simultaneously having a width larger than that of the first separator 1306. The first separator 1306 protrudes upwards beyond the first electrode 1302 so that a reservoir (or an empty space) is formed between two first separators, and the fluid 1303d is contained in the reservoir. The reservoir containing the fluid 1303d is formed into a pixel.

Here, the region provided with the first electrode 1302, the fluid 1303d including dispersed charged particles 1303a, second electrode 1304 and first separator 1306 may be defined as a display region 132. In addition, the region provided with only the second separator 1307 without the charged particles 1303a and fluid 1303d may be defined as a non-display region 131. Thus, predetermined images (various characters, numbers, specific symbols, still images and moving images) are displayed through the display region 132, but any image is not displayed through the non-display region 131.

The first substrate 1301 may be made with any one selected from glass, plastic resin, nano complex, metal and its equivalents, but not limited thereto.

The first electrode 1302 may be formed on a silicon oxide layer, a silicon nitride layer or a silicon oxide nitride layer, which is formed on the first substrate 1301, or may be formed directly on the first substrate 1301. The first electrode 1302 may be formed of any one selected from ITO (indium tin oxide), ITO/Ag, ITO/Ag/ITO, ITO/Ag/IZO (indium zinc oxide) and its equivalents, but not limited thereto. In addition, the first electrode 1302 may be coated with an insulation layer for protection from the fluid, but not limited thereto.

The fluid 1303d including dispersed charged particles 1303a may be formed on the first electrode 1302. The charged particle 1303a may be formed in any one color selected from red, blue, green, black and white. More particularly, the charged particle 1303a may be formed of a core 1303b and a colored layer 1303c formed on the surface of the core 1303b. For example, the core 1303b may be any one selected from black titanium dioxide, silica and its equivalents, but not limited thereto. In addition, the colored layer 1303c may be formed in any one color selected from red, blue, green, black and white. In addition, the fluid 1303d may be any one selected from an organic solvent and its equivalents, but not limited thereto. The charged particles 1303a are previously charged positively or negatively, and thus move in a predetermined direction according to the direction of electric field formed between the first and second electrodes 1302 and 1304. When the charged particles 1303a move upwards closer a user, the user strongly senses the color of the charged particles 1303a. However, when the charged particles 1303a move downwards farther from a user, the user weakly senses the color of the charged particles 1303a. The movement of the charged particles 1303a is caused by electrophoresis. The electrophoresis is phenomenon that particles with charge on the surface thereof move toward an oppositely charged electrode in electric field. The electrophoresis is known as the phenomenon that should be interpreted by colloidal science and fluid mechanics, not by electromagnetic phenomenon.

The second electrode 1304 may be formed on the fluid 1303d including dispersed charged particles 1303a in the direction crossing the first electrode 1302. The second electrode 1304 may be formed of any one selected from ITO (indium tin oxide), ITO/Ag, ITO/Ag/ITO, ITO/Ag/IZO (indium zinc oxide) and its equivalents, but not limited thereto.

In addition, the second electrode 1304 may be coated with an insulation layer for protection from the fluid, but not limited thereto.

The first separator 1306 is formed between the first electrodes 1302 (in other words, between the fluids 1303d) for isolating the first electrode 1302 physically. The first separator 1306 is formed thicker than the first electrode 1302, thereby allowing the first electrodes 1302 to be physically isolated from each other. In addition, the first separator 1306 may be formed in trapezoid shape whose upper edge is the same as the lower edge, but not limited thereto. In other words, the first separator 1306 may be a trapezoid shape whose lower edge is longer than the upper edge or the upper edge may be longer than the lower edge. In addition, the first separator 1306 may be formed by exposure and development of polyimide or photoresist, but not limited thereto.

The second separator 1307 may be formed on the outer circumference edge of the display region 132. In other words, the second separator 1307 may be respectively formed on the outer circumference edge of the fluid 1303d. The second separator 1307 may be formed wider than the first separator 1306. Actually, the non-display region 131 may be defined by the second separator 1307. In other words, the region provided with the fluid 1303d and first separator 1306 may be defined as the display region 132, and the region provided with the second separator 1307 may be defined as the non-display region 131. On the other hand, a black matrix 1308 may be further formed on the first separator 1306 and on the second separator 1307 for clarifying boundaries between pixels, but not limited thereto.

On the other hand, a transparent second substrate 1309 may be further formed on the first separator 1306 and second separator 1307 which define the display region 132 and non-display region 131, respectively. The second substrate 1309 may contact or may not contact the first separator 1306 and second separator 1307. The second substrate 1309 prevents external moisture and dusts from reaching the fluid 1303d.

In addition, a backlight 1310 may be further provided under the first substrate 1301. The electrophoretic display device can display images only in daylight as well known. In other words, the electrophoretic display device is not a self-emitting device, and thus it cannot display images without daylight. However, the display of the present invention can always display images by driving the backlight 1310 when daylight is not provided.

The circuit board 140 having the opening 142 and key 143 may be placed on the second electrode 1308. Actually, the opening 142 of the circuit board 140 has an almost same size as the display region 132 formed in the electrophoretic display panel 1300. In addition, the pad 150 having the transparent window 152 and pressing unit 153 may be placed on the circuit board 140. Actually, the transparent window 152 of the pad 150 has an almost same size as the opening 142 formed in the circuit board 140. In addition, the cover 160 having the window 162 may be placed on the pad 150. Actually, the window 162 of the cover 160 has an almost same size as the sum of the sizes of the transparent window 152 and pressing unit 153 of the pad 150. In other words, the pressing unit 153 formed on the pad 150 can be exposed to the outside through the window 162 of the cover 160. In addition, at least one of the opening 142, transparent window 152 and window 162 may be covered by any one selected from a transparent resin, a transparent glass and its equivalents for protecting the display region 132 from external environments. The opening 142, transparent window 152, or window 162 may be not covered.

As described above, the electrophoretic display panel 1300 is divided into the non-display region 131 and the display region 132. The first key 143 formed on the circuit board 140 may be located in the region corresponding to the non-display region 131 of the electrophoretic display panel 1300. Actually, the first key 143 of the circuit board 140 may be formed in the region corresponding to the second separator 1307. The second separator 1307 is thicker than the emitting layer 1303 formed on the display region 132, and wider than the first separator 1306 formed on the display region 132 as described above. Thus, even if the key 143 is pressed when the user presses the pressing unit 153 of the pad 150, the second electrode 1308 and the second separator 1307 under the second substrate absorb, damp and endure the pressure sufficiently. Therefore, damage or display quality degradation of the display region 132 does not occur in spite of the user's key operation.

A reference numeral 134 indicates the bezel placed under the backlight 1310 that forms the electrophoretic display panel 1300, and a reference numeral 120 indicates the main circuit board placed under the 134, and a reference numeral 110 indicates a case placed under the main circuit board 120. These elements have been already explained in the above description, detailed explanation will be omitted.

Figure 5:
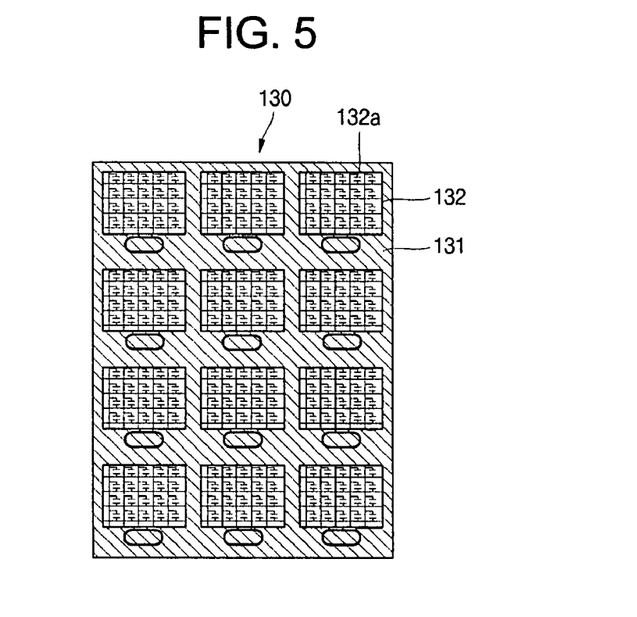
FIG. 5 is a schematic plan view illustrating display regions and non-display region formed on the electrophoretic display panel of the display for a multi-function key pad.

FIG. 5 shows a schematic plan view illustrating display regions and non-display region formed on the electrophoretic display panel of the display for a multi-function key pad. Referring to FIG. 5, the electrophoretic display panel 130 may include the non-display region 131 and the display region 132 displaying characters, numbers, specific symbols, still images and moving images. The display region 132 may be formed in matrix form having rows and columns. Actually, a plurality of pixels 132a are formed in the display region 132, but pixels are not formed in the non-display region 131.

According to the structure as described above, even if the size of the electrophoretic display panel 130 becomes relatively large, electrode resistance and capacitance of the fluid are not increased so much.

For example, when the total area of the electrophoretic display panel 1300 is 20 cm² (for example, 4 cm×5 cm) and the area of one display region 132 is 1 cm and the number of the display region 132 is twelve, the total area of the display region 132 becomes 12 cm². Thus, power is not consumed for the entire electrophoretic display panel 130 having the area of 20 cm², but actually, power is consumed for the display region 132 having the area of 12 cm². In other words, in a viewpoint of power consumption, the display panel is not the electrophoretic display panel 130 of roughly 20 cm², but the electrophoretic display panel 130 of roughly 12 cm².

On the other hand, portions of oval shape in FIG. 5 show regions corresponding to the first key 143 of the circuit board 140. In other words, the first key 143 of the circuit board 140 pressed by the user is the region corresponding to the non-display region 131, but is not correspond to the display region 132 of the electrophoretic display panel 130. That is, the region in the electrophoretic display panel 130 corresponding to the key 143 of the circuit board 140 is the region where pixels are not formed.

Figure 6:
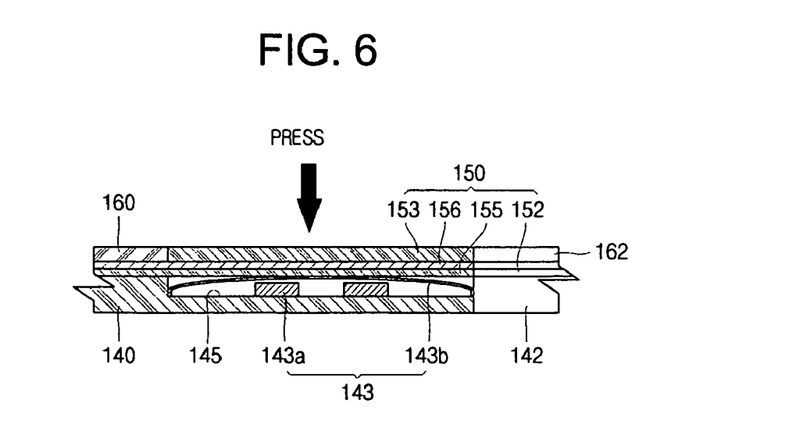
FIG. 6 is a magnified sectional view illustrating a key of the display for a multi-function key pad and a structure around it.

FIG. 6 shows a magnified sectional view illustrating the key and its peripheral structure of the display for a multi-function key pad. Referring to FIG. 6, the first key 143 located in the region corresponding to the non-display region 131 of the electrophoretic display panel 130 may be any one selected from, for example, a dome switch and its equivalents, but not limited thereto. That is, the first key 143 shown in FIG. 6 is illustrated as an example for comprehension of the present invention, but not limited thereto. The first key 143 may be formed of at least one conduction pattern 143a formed on the circuit board 140 and an elastic member 143b detachable from the conduction pattern 143a. The elastic member 143b may be a conductor, or may include a conduction layer formed on inner surface. In addition, it is shown in FIG. 6 that a cavity 145 is formed in the region of the circuit board 140 where the key 143 is formed, but not limited thereto. In other words, the cavity 145 may not be formed if necessary.

On the other hand, the pad 150 placed on the circuit board 140 may have a multi-layer structure. Likewise, the pad 150 shown in the drawing is just an example, but not limited thereto. The pad 150 may be formed of an insulation layer 155 formed at the lowermost for contacting the circuit board 140 or the key 143, a thin metal layer 156 formed on the insulation layer 155, and the pressing unit 153 formed in the region corresponding to the key 143 at the upper part of the metal layer 156. The insulation layer 155 enables the pad 150 to stably and closely contact the upper part of the circuit board 140 and key 143, and the metal layer 156 secures rigidity of the pad 150, and the first pressing unit 153 transmits pressing force of the user to the key 143. The pressing unit 153 may be formed of usual resin, metal and its equivalents, but not limited thereto. In addition, the pressing unit 153 is projected upward in predetermined thickness, thereby allowing the user to press it easily. The cover 160 is mounted on the pad 150 and the first pressing unit 153 of the pad 150 is exposed to the upper part through the window 162 formed in the cover 160. Here, the thickness of the first pressing unit 153 may be controlled so as to be projected or not to be projected out of the pad 150.

Figure 7:
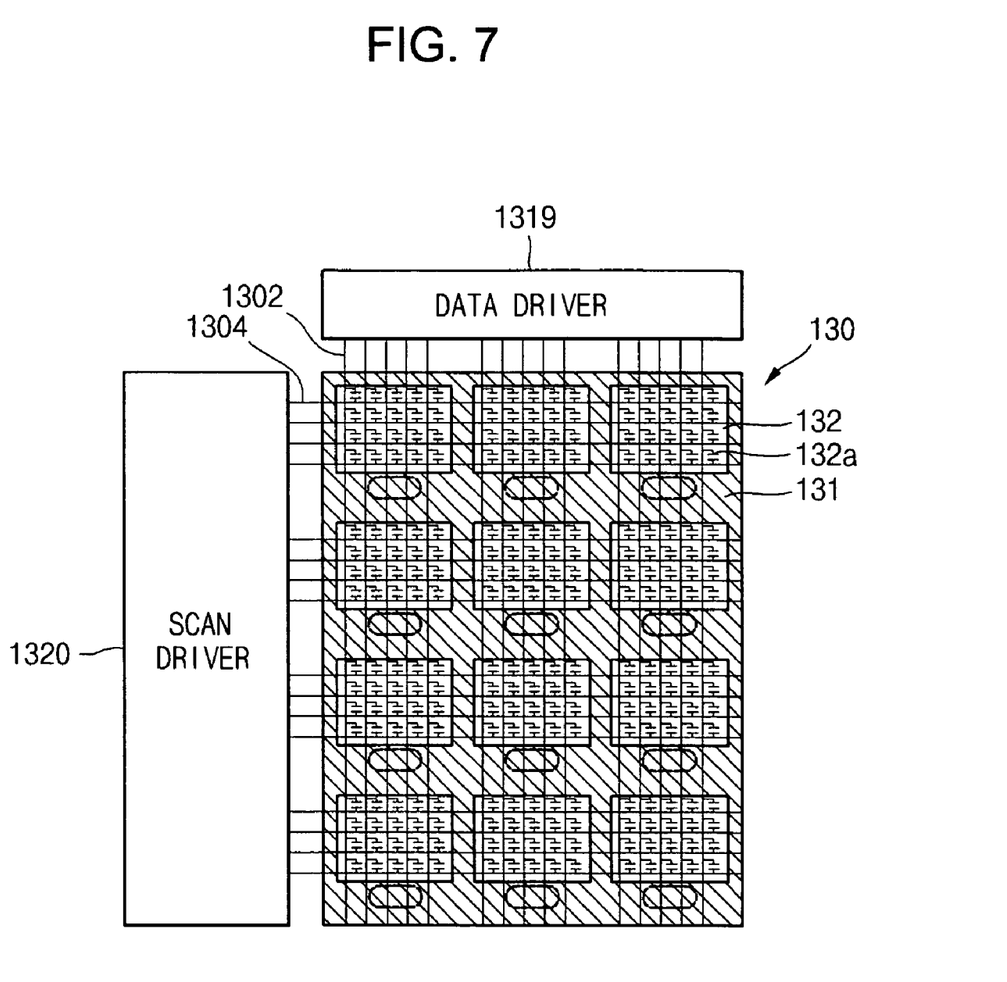
FIG. 7 is a schematic view illustrating an electrical construction of the electrophoretic display panel of the display for a multi-function key pad.

FIG. 7 shows a schematic view illustrating an electrical construction of the electrophoretic display panel of the display for a multi-function key pad. Referring to FIG. 7, the electrophoretic display panel 130 is formed of the non-display region 131 and a plurality of display regions 132. A plurality of pixels 132a may be formed in the display region 132. In addition, the first electrode 1302 and the second electrode 1304 may be formed in the display region 132. In addition, for example, a data driver 1319 may be electrically coupled to the first electrode 1302 for applying a data signal to the display region 132, and a scan driver 1320 may be electrically coupled to the second electrode 1304 for applying a scan signal to the display region 132. The data driver 1319 may be referred to as a source driver or a column driver, and the scan driver 1320 may be referred to as a gate driver or a row driver.

As described above, pixels are not formed on the non-display region 131 of the electrophoretic display panel 130. In other words, pixels are formed only in the selected display region 132. Thus, power consumption is low and manufacturing yield is improved compared with the case where the display region 132 or pixels are formed on the entire electrophoretic display panel 130, and thus manufacturing cost is saved.

Oval regions in the drawing are regions corresponding to the key 143 formed on the circuit board 140. As shown in the drawing, the key 143 corresponds to the non-display region 131 of the electrophoretic display panel 130, thereby preventing damage or display quality degradation of the display region 132 when the key 143 is operated.

Figure 8:
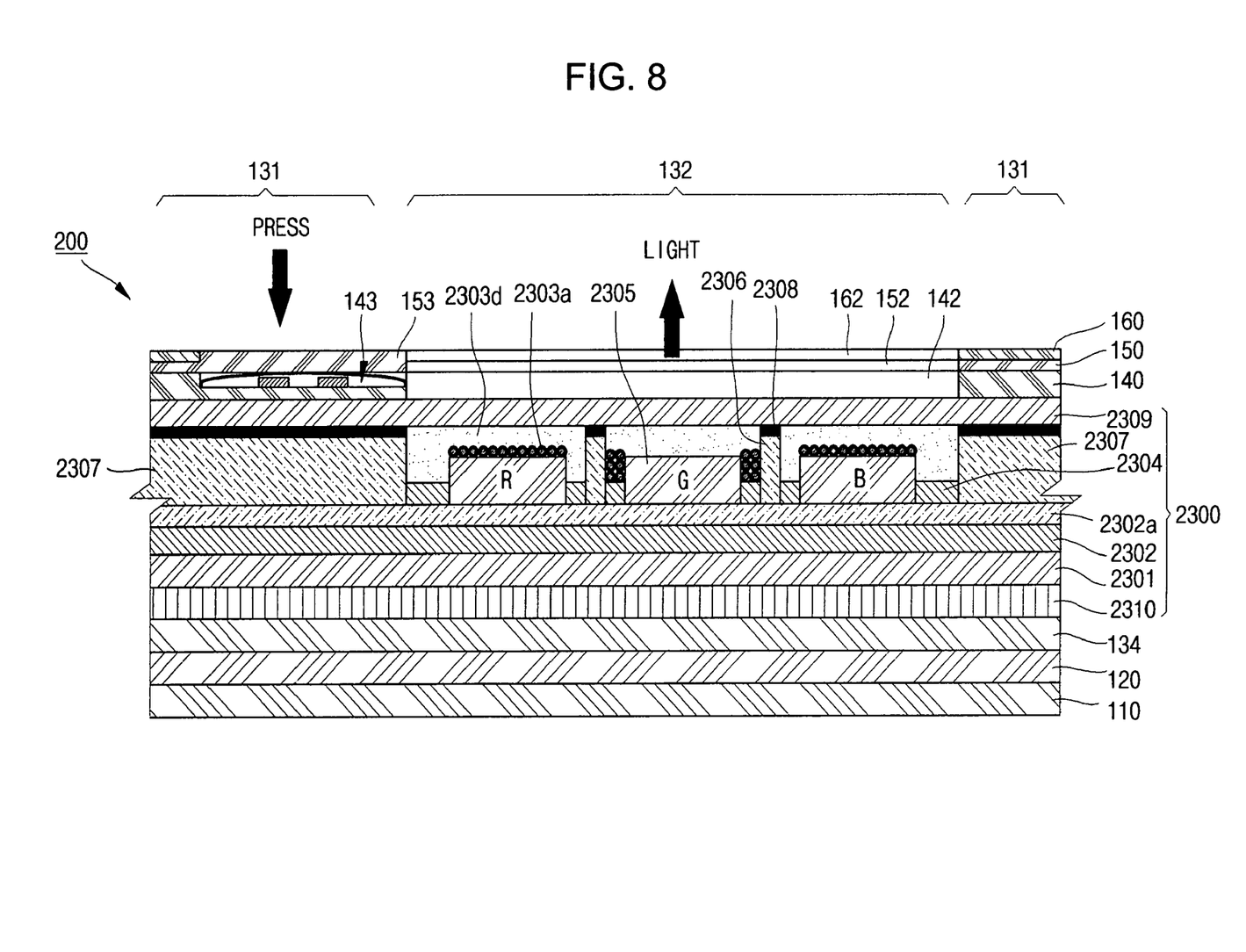
FIG. 8 is a schematic sectional view illustrating a display for a multi-function key pad according to another exemplary embodiment of the present invention.

FIG. 8 shows a schematic sectional view illustrating a display for a multi-function key pad according to another exemplary embodiment of the present invention. A display 200 for a multi-function key pad shown in FIG. 8 is not exactly proportional to actual size, thickness and length, and exaggerated or simplified for comprehension of the present invention (a capacitor is included, but omitted). For example, three fluids 2303d are shown in FIG. 8. However, the fluid may be actually formed in much more or less numbers. In addition, a key 143 of a circuit board 140 shown in FIG. 8 is shown to have a length similar to a length of the fluid 2303d, but may be actually much larger or smaller.

Referring to FIG. 8, the electrophoretic display panel 230 includes a first substrate 2301, a first electrode 2302 formed on the first substrate 2301, an insulation layer 2302a formed on the first electrode 2302, a plurality of second electrodes 2304 formed on the insulation layer 2302a, color filters 2305 formed between the second electrodes 2304, a fluid 2303d placed on the color filter 2305 and including dispersed charged particles, a first separator 2306 formed between the color filters 2305, and a second separator 2307 formed at the outer edge of the first separator 2306. A reservoir (or an empty space) is formed between two first separators, and the fluid 2303d is contained in the reservoir. The reservoir containing the fluid 2303d forms a pixel.

Here, the region provided with the first electrode 2302, fluid 2303d, second electrode 2304 and first separator 2306 may be defined as a display region 132, and the region provided with only the second separator 2307 without the fluid 2303d may be defined as a non-display region 131.

The first substrate 2301 may be made with any one selected from glass, plastic resin, nano complex, metal and its equivalents, but not limited thereto.

The first electrode 2302 may be formed on the first substrate 2301. The first electrode 2302 may be formed of any one selected from ITO, ITO/Ag, ITO/Ag/ITO, ITO/Ag/IZO and its equivalents, but not limited thereto. In addition, the first electrode 2302 may be coated with an insulation layer for protection from the fluid and simultaneously electrical isolation from the second electrode to be described below, but not limited thereto.

The second electrode 2304 may be formed on the insulation layer 2302a in the direction crossing the first electrode 2302. The second electrode 2304 may be formed of any one selected from ITO, ITO/Ag, ITO/Ag/ITO, ITO/Ag/IZO and its equivalents, but not limited thereto. In addition, the second electrode 2304 may be coated with an insulation layer for protection from the fluid, but not limited thereto.

The color filter 2305 may be formed between the second electrodes 2304. That is, the color filter 2305 may be formed on the insulation layer 2302a corresponding to the first electrode 2302. The color filter 2305 may have a color selected from red, green and blue colors.

The fluid 2303d including dispersed charged particles 2303a is placed in the region (or a reservoir) defined by the second electrode 2304, the color filter 2305 and the separator 2306. Here, the charged particles 2303a may have black or white color.

If the charged particles 2303a have negative polarity and a positive voltage is applied to the first electrode 2302 and a negative voltage is applied to the second electrode 2304, the color filter 2305 is covered by the charged particles 2303a. Thus, the user cannot identify the color of the color filter 2305. If the charged particles 2303a are black, the user can see only black color. However, if a negative voltage is applied to the first electrode 2302 and a positive voltage is applied to the second electrode 2304, the charged particles 2303a are collected mainly on the second electrode 2304. In other words, the color filter 2305 is not covered by the charged particles 2303a. Thus, the user can see the color of the color filter 2305.

The first separator 2306 is formed between the second electrodes 2304 (in other words, between the fluids 2303d) for isolating the second electrode 1302 physically. The first separator 2306 is formed thicker than the second electrode 2304 (or protrudes upwards beyond the second electrode 2304), thereby allowing the second electrodes 2304 to be physically isolated from each other. In addition, the first separator 2306 may be formed in trapezoid shape whose upper edge is the same as the lower edge, but not limited thereto. In other words, the first separator 2306 may be a trapezoid shape whose lower edge is longer than the upper edge or the upper edge may be longer than the lower edge. In addition, the first separator 2306 may be formed by exposure and development of polyimide or photoresist, but not limited thereto.

The second separator 2307 may be formed on the outer circumference edge of the display region 132. In other words, the second separator 2307 may be respectively formed on the outer circumference edge of the fluid 2303d. The second separator 2307 may be formed wider than the first separator 2306. Actually, the non-display region 131 may be defined by the second separator 2307. In other words, the region provided with the fluid 2303d and first separator 2306 may be defined as the display region 132, and the region provided with the second separator 2307 may be defined as the non-display region 131. On the other hand, a black matrix 2308 may be further formed on the first separator 2306 and on the second separator 2307 for clarifying boundaries between pixels, but not limited thereto.

On the other hand, a transparent second substrate 2309 may be further formed on the first separator 2306 and second separator 2307 which form the display region 132 and non-display region 131. The second substrate 2309 may contact or may not contact the first separator 2306 and second separator 2307. The second substrate 2309 prevents external moisture and dusts from reaching the fluid 2303d.

In addition, a backlight 2310 may be further provided under the first substrate 2301. The electrophoretic display device can display images only in daylight as well known. In other words, the electrophoretic display device is not a self-emitting device, and thus it cannot display images without daylight. However, the display of the present invention can always display images by driving the backlight 2310 when daylight is not provided.

The circuit board 140 having the opening 142 and first key 143 may be placed on the second substrate 2309, and the pad 150 having the transparent window 152 and first pressing unit 153 may be placed on the circuit board 140, and a cover 160 may be placed on the pad 150. The structure has been explained in the above description, and thus detailed explanation will be omitted.

As described above, the electrophoretic display panel 2300 is divided into the non-display region 131 and the display region 132. The first key 143 formed on the circuit board 140 is located in the region corresponding to the non-display region 131 of the electrophoretic display panel 2300. Actually, the first key 143 of the circuit board 140 may be formed in the region corresponding to the second separator 2307. The second separator 2307 is wider than the first separator 2306 formed on the display region 132 as described above. Thus, even if the first key 143 is pressed when the user presses the pressing unit 153 of the pad 150, the second substrate 2309 and the second separator 2307 under the second substrate absorb, damp and endure the pressure sufficiently. Therefore, damage or display quality degradation of the display region 132 does not occur even if the user presses the first key 143 excessively.

A reference numeral 134 indicates a bezel placed under the first substrate 2301 that forms the electrophoretic display panel 2300, and a reference numeral 120 indicates a main circuit board placed under the 134, and a reference numeral 110 indicates a case placed under the main circuit board 120.

Figure 9:
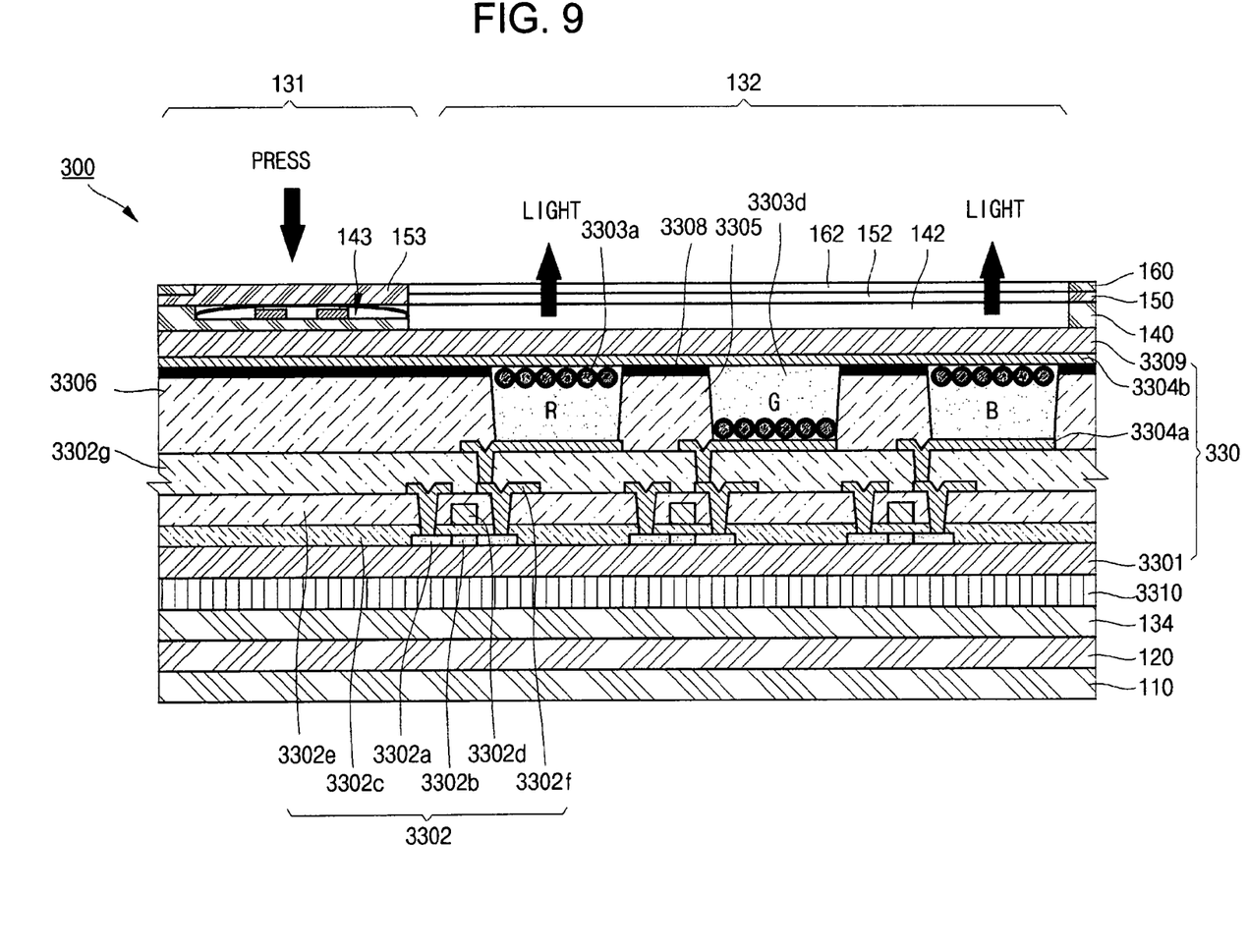
FIG. 9 is a schematic sectional view illustrating a display for a multi-function key pad according to a still another exemplary embodiment of the present invention.

FIG. 9 shows a schematic sectional view illustrating a display for a multi-function key pad according to a still another exemplary embodiment of the present invention. A display 300 for a multi-function key pad shown in FIG. 9 is not exactly proportional to actual size, thickness and length, and exaggerated or simplified for comprehension of the present invention. For example, three transistors 3302, three first electrodes 3304a and three fluids 3303d are shown in FIG. 9. However, those may be actually formed in much more or less numbers. In addition, a width of a key 143 of a circuit board 140 shown in FIG. 9 is similar to that of one fluid 3303d, but, may be much larger or smaller actually.

Referring to FIG. 9, the electrophoretic display panel 3300 includes a first substrate 3301, the transistor 3302 formed on the first substrate 3301, an insulation layer 3302g formed on the transistor 3302, the first electrode 3304a electrically coupled to the transistor 3302, the fluid 3303d formed on the first electrode 3304a and including dispersed charged particles 1303a, a second electrode 3304b formed on the fluid 3303d, a first separator 3305 defining each pixel, and a second separator 3306 formed on the outer periphery of the first separator 3305.

Here, the region provided with the three first transistors 3302, three first electrodes 3304a, three fluids 3303d and two first separators 3305 may be defined as a display region 132, and the region provided with the second separator 3306 may be defined as a non-display region 131.

The first substrate 3301 may be made with any one selected from glass, plastic resin, nano complex, metal and its equivalents, but not limited thereto.

The transistor 3302 may be formed on a silicon oxide layer, a silicon nitride layer or a silicon oxide nitride layer formed on the first substrate 3301, or may be formed directly on the first substrate 3301. The transistor 3302 may be actually a thin film transistor, and have a source/drain region 3302a and a channel region 3302b. A gate insulation layer 3302c may be formed on the surface of the transistor 3302, and a gate electrode 3302d may be formed in the region corresponding to the channel region 3302b. In addition, a dielectric layer 3302e may be formed to cover the gate electrode 3302d, and a source/drain electrode 3302f electrically coupled to the source/drain region 3302a may be formed on the dielectric layer 3302e. Here, the structure of the transistor 3302 may be any one selected from all contemporary structures of the thin film transistor, for example, an inverted coplanar structure, a staggered structure, an inverted staggered structure and its equivalents, but not limited thereto.

The insulation layer 3302g may be formed on the surface of the transistor 3302. The insulation layer 3302g prevents moisture from permeating into the transistor 3302, and simultaneously planarizes the surface. The insulation layer 3302g may be any one selected from an organic layer, an inorganic layer and its equivalents or mixture thereof but not limited thereto.

The first electrode 3304a may be formed on the insulation layer 3302g and electrically coupled to the source/drain electrode 3302f of the transistor 3302. The first electrode 3304a may be formed of any one selected from ITO, ITO/Ag, ITO/Ag/ITO, ITO/Ag/IZO and its equivalents, but not limited thereto. The first electrode 3304a has been also explained in the above description, and thus detailed explanation will be omitted.

The fluid 3303d including dispersed charged particles 3303a may be formed on the first electrode 3304a. The charged particle 3303a may be formed in any one color selected from red, blue, green, black and white. In addition, the charged particle 3303a may be formed of a core and a colored layer formed on the surface of the core. For example, the core may be at least one of titanium dioxide and silica. In addition, the fluid 3303d may be an organic solvent. The fluid 3303d including dispersed charged particles 3303a has been also explained in the above description, and thus detailed explanation will be omitted.

The second electrode 3304b may be arranged on the fluid 3303d including dispersed charged particles 3303a. The second electrode 3304b may be formed of any one selected from ITO, ITO/Ag, ITO/Ag/ITO, ITO/Ag/IZO and its equivalents, but not limited thereto. The second electrode 3304b has been also explained in the above description, and thus detailed explanation will be omitted.

The first separator 3305 is formed between the fluids 3303d for physically isolating the charged particles and the fluids from each other. The first separator 3305 may be formed in trapezoid shape whose upper edge is shorter than the lower edge, but not limited thereto. In addition, the first separator 3305 may be formed by exposure and development of polyimide, but not limited thereto.

The second separator 3306 may be formed on the outer circumference edge of the fluid 3303d that forms the display region 132. The second separator 3306 may be formed wider than the first separator 3305. Actually, the non-display region 131 may be defined by the second separator 3306. In other words, the first electrode 3304a, fluid 3303d and first separator 3305 may be defined as the display region 132, and the second separator 3306 may be defined as the non-display region 131. On the other hand, a black matrix 3308 may be formed on the first and second separators 3305 and 3306, but not limited thereto.

On the other hand, a transparent second substrate 3309 may be further formed on the first and second separators 3305 and 3306 which form the non-display region 131 and display region 131, respectively. The second substrate 1308 may contact or may not contact the first and second separators 3305 and 3306. The second substrate 3309 prevents external moisture and dusts from reaching the fluid 3303d.

The circuit board 140 having the opening 142 and key 143 may be placed on the second substrate 3309. In addition, the pad 150 having the transparent window 152 and pressing unit 153 may be placed on the circuit board 140, and the cover 160 having the window 162 may be placed on the pad 150. The structures have been also explained in the above description, and thus detailed explanation will be omitted.

As described above, the electrophoretic display panel 3300 is divided into the non-display region 131 and the display region 132. The key 143 formed on the circuit board 140 may be located in the region corresponding to the non-display region 131 of the electrophoretic display panel 130. The second separator 3306 is formed wider than the first separator 3305 formed on the display region 132 as described above. Thus, even if the first key 143 is pressed when the user presses the pressing unit 153 of the pad 150, the second substrate 3309 and the second separator 3306 under the second substrate absorb, damp and endure the pressure sufficiently. Therefore, damage or display quality degradation of the display region 132 does not occur even if the user excessively presses the key.

In addition, a backlight 3310 may be further provided under the first substrate 3301. The electrophoretic display device can display images only in daylight as well known. In other words, the electrophoretic display device is not a self-emitting device, and thus it cannot display images without daylight. However, the display of the present invention can always display images by driving the backlight 3310 when daylight is not provided.

Figure 10A:
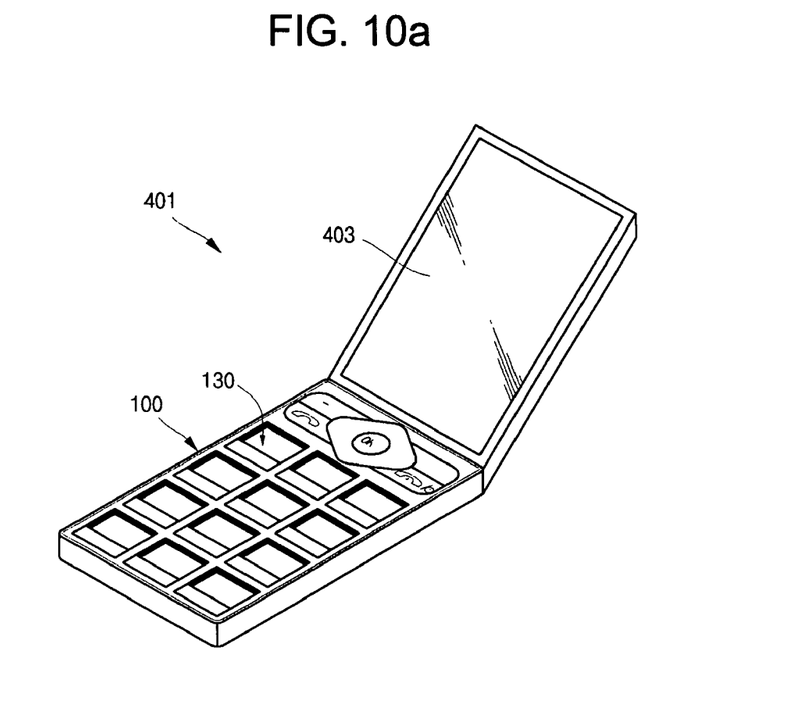
FIGS. 10a and 10b are schematic perspective views illustrating examples of an electronic device having the display for the multi-function key pad.
Figure 10B:
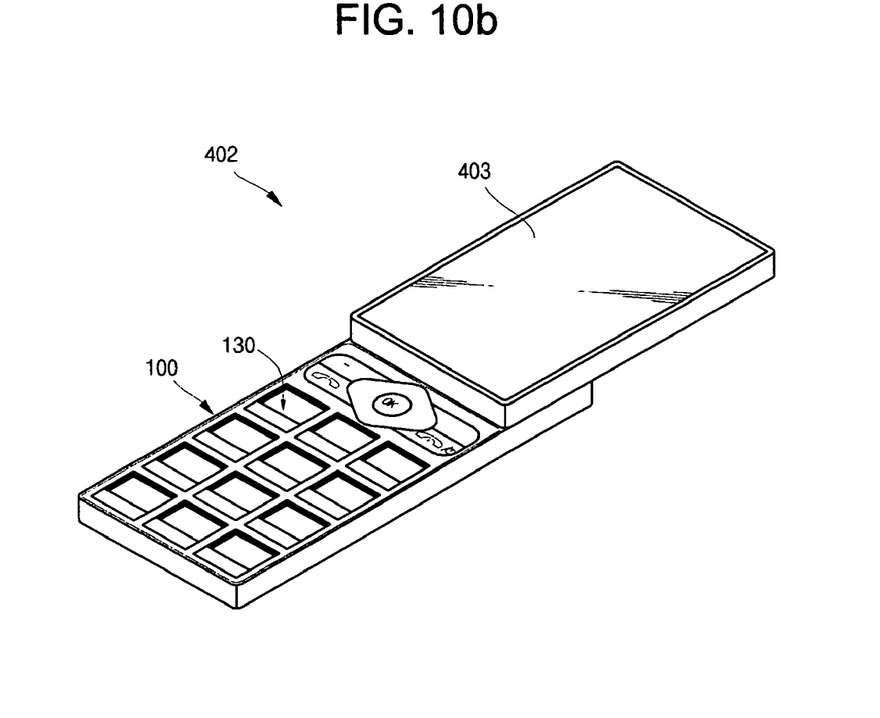

FIGS. 10a and 10b show perspective views illustrating examples of electronic devices 401 and 402 having the display for a multi-function key pad. Referring to FIGS. 10a and 10b, the display 100 (or, the displays 200 and 300) for a multi-function key pad can be used in the electronic devices 401 and 402 having the main display panel 403. More particularly, as shown in FIG. 10a, the electronic device 401 may be a folder type mobile phone. The electronic device 401 includes an electrophoretic display panel 130 of the display for a multi-function key pad in addition to the main display panel 403, and thus has total two display panels. In addition, as shown in FIG. 10b, the electronic device 402 may be a slide type mobile phone. The electronic device 402 also includes an electrophoretic display panel 130 of the display for a multi-function key pad in addition to the main display panel 403, and thus has total two display panels. The main display panel may be any one selected from a usual liquid crystal display panel, a passive organic light emitting display panel and an active organic light emitting display panel, but not limited thereto.

In addition, the display 100 for a multi-function key pad can be used in various electronic devices such as a MP3 player, a car audio, an auto console, a PDA and other industrial displays, but not limited thereto.

As described above, the display for a multi-function key pad and the electronic device having the same according to the present invention produce the following effects.

First, the display for multi-function key pad and the electronic device having the same can input various instructions and output information by using the key pad. Second, the display for a multi-function key pad and the electronic device having the same can provide a shallow user interface depth and easy key operation by variously changing and displaying characters, numbers, specific symbols, still images and moving images according to the user's choice. Third, the display for multi-function key pad and the electronic device having the same can keep images without continuous voltage supply and thus minimize power consumption due to bistable characteristic of the electrophoretic display panel. Fourth, the display for multi-function key pad and the electronic device having the same can easily display various images even in the night without daylight by further including a backlight at one side of the electrophoretic display panel.

It should be understood by those of ordinary skill in the art that various replacements, modifications and changes in the form and details may be made therein without departing from the spirit and scope of the present invention as defined by the following claims. Therefore, it is to be appreciated that the above described embodiments are for purposes of illustration only and are not to be construed as limitations of the invention.

What is claimed is:

1. A display for a multi-function key pad, comprising:
   an electrophoretic display panel including a plurality of display regions, each of the display regions enclosed by a non-display region, the electrophoretic display panel comprising:
   a first substrate;
   a second substrate facing the first substrate;
   a plurality of first separators formed between the first and the second substrates and formed in the display region;

a second separator formed between the first and the second substrates and formed in the non-display region; and a fluid disposed between two of the first separators, the fluid disposed in the display regions, the fluid including charged particles;

a circuit board arranged on the electrophoretic display panel, the circuit board including a plurality of openings formed on regions corresponding to the display regions of the electrophoretic display panel, and a plurality of keys formed on regions that are outer circumference edges of the openings and correspond to the non-display region; and a pad arranged on the circuit board, the pad including a plurality of transparent windows formed on regions corresponding to the openings of the circuit board and including a plurality of pressing units formed on regions that are outer circumference edges of the transparent windows and correspond to the keys.

2. The display of claim 1, wherein the electrophoretic display panel includes pixels for displaying an image, and the pixels are formed only on the display regions of the electrophoretic display panel.

3. The display of claim 1, wherein the electrophoretic display panel comprises:
a first electrode; and
a second electrode intersecting the first electrode, the fluid arranged between the first and the second electrodes.

4. The display of claim 3, wherein the electrophoretic display panel comprises:
a data driver for applying a data signal to the first electrode; and
a scan driver for applying a scan signal to the second electrode.

5. The display for a multi-function key pad of claim 3, wherein the second separator is wider than the first separator, the keys of the circuit board being disposed on the second separator.

6. The display for a multi-function key pad of claim 5, further comprising a transparent substrate arranged on the first and second separators, the keys of the circuit board being disposed on the transparent substrate in regions corresponding to the second separator.

7. The display for a multi-function key pad of claim 3, wherein the charged particles are formed in a color selected from the group consisting of red, blue, green, black, and white colors.

8. The display for a multi-function key pad of claim 3, wherein each of the charged particles includes a core and a colored layer formed on the surface of the core.

9. The display for a multi-function key pad of claim 8, wherein the core is formed with titanium dioxide or silica.

10. The display for a multi-function key pad of claim 3, wherein the fluid includes an organic solvent.

11. The display for a multi-function key pad of claim 1, wherein the electrophoretic display panel comprises:
a plurality of first electrodes;
an insulation layer formed on the first electrodes;
a plurality of second electrodes formed on the insulation layer in the direction crossing the first electrodes; and
a color filter formed between two of the second electrodes the fluid formed on both of the second electrode and color filter.

12. The display for a multi-function key pad of claim 11, wherein the color filter has a color selected from the group consisting of red, green, and blue colors.

13. The display for a multi-function key pad of claim 11, wherein the second separator is wider than the first separator, the keys of the circuit board disposed on the second separator.

14. The display for a multi-function key pad of claim 13, further comprising a transparent substrate arranged on the first and second separators, the keys of the circuit board being disposed on the transparent substrate in regions corresponding to the second separator.

15. The display for a multi-function key pad of claim 1, wherein the electrophoretic display panel comprises:
a first electrode;
a second electrode intersecting the first electrode; and
a transistor connected to the first electrode, the fluid arranged between the first and the second electrodes.

16. The display for a multi-function key pad of claim 15, wherein the second separator is wider than the first separator, the keys of the circuit board disposed on the second separator.

17. The display for a multi-function key pad of claim 16, further comprising a transparent substrate arranged on the first and second separators, the keys of the circuit board being disposed on the transparent substrate in regions corresponding to the second separator.

18. The display for a multi-function key pad of claim 1, further comprising a backlight provided under the electrophoretic display panel.

19. The display for a multi-function key pad of claim 1, wherein the keys formed on the circuit board include a dome switch.

20. The display for a multi-function key pad of claim 1, wherein each of the keys comprises:
a conduction pattern formed in the region corresponding to the non-display region of the electrophoretic display panel; and
an elastic member detachably formed on the conduction pattern.

21. The display for a multi-function key pad of claim 1, wherein the pad comprises:
an insulation layer;
a metal layer formed on the insulation layer; and
a pressing unit formed in the region on the metal layer corresponding to the key.

22. The display for a multi-function key pad of claim 21, wherein the pressing unit projects upward.

23. An electronic device, comprising a display for the mu unction key pad of claim 1.

24. The electronic device of claim 23, further comprising a main display panel electrically and mechanically connected to the display for a multi-function key pad.

* * * * *